US008064934B2

(12) United States Patent
Klassen (10) Patent No.: US 8,064,934 B2
(45) Date of Patent: Nov. 22, 2011

(54) METHOD, SYSTEM AND APPARATUS FOR AUTOMATIC NOTIFICATION TO A PLURALITY OF COMMUNICATION NODES

(75) Inventor: Gerhard Dietrich Klassen, Waterloo (CA)

(73) Assignee: Research In Motion Limited, Waterloo (CA)

( * ) Notice: Subject to any disclaimer, the term of this patent is extended or adjusted under 35 U.S.C. 154(b) by 603 days.

(21) Appl. No.: 11/584,418

(22) Filed: Oct. 19, 2006

(65) Prior Publication Data

US 2008/0096589 A1  Apr. 24, 2008

(51) Int. Cl.
*H04W 4/00* (2009.01)
(52) U.S. Cl. ......................... 455/466; 455/420
(58) Field of Classification Search .................. 455/466, 455/447, 575; 381/58; 379/210, 265; 709/227, 709/206, 207; 370/428, 348, 229
See application file for complete search history.

(56) References Cited

U.S. PATENT DOCUMENTS

| | | | | |
|---|---|---|---|---|
| 5,548,725 A | * | 8/1996 | Tanaka et al. | 709/208 |
| 6,032,051 A | * | 2/2000 | Hall et al. | 455/518 |
| 6,615,166 B1 | * | 9/2003 | Guheen et al. | 703/27 |
| 6,668,169 B2 | * | 12/2003 | Burgan et al. | 455/435.1 |
| 6,735,615 B1 | * | 5/2004 | Iwayama et al. | 709/204 |
| 2003/0218631 A1 | * | 11/2003 | Malik | 345/739 |
| 2004/0015547 A1 | * | 1/2004 | Griffin et al. | 709/204 |
| 2004/0015548 A1 | * | 1/2004 | Lee | 709/204 |
| 2004/0058694 A1 | * | 3/2004 | Mendiola et al. | 455/466 |
| 2004/0203617 A1 | * | 10/2004 | Knauerhase et al. | 455/412.1 |
| 2004/0203766 A1 | * | 10/2004 | Jenniges et al. | 455/435.1 |
| 2005/0083941 A1 | * | 4/2005 | Florkey et al. | 370/395.2 |
| 2005/0086211 A1 | * | 4/2005 | Mayer | 707/3 |
| 2005/0125496 A1 | * | 6/2005 | Thuerk | 709/204 |
| 2005/0136988 A1 | * | 6/2005 | Villamil et al. | 455/567 |
| 2005/0166154 A1 | * | 7/2005 | Wilson et al. | 715/751 |
| 2006/0009243 A1 | * | 1/2006 | Dahan et al. | 455/466 |
| 2006/0010200 A1 | * | 1/2006 | Mousseau et al. | 709/204 |
| 2006/0014552 A1 | * | 1/2006 | Cunningham et al. | 455/466 |

(Continued)

FOREIGN PATENT DOCUMENTS

JP   2004348483   12/2004

(Continued)

OTHER PUBLICATIONS

European Examination Report; Application No. 06 122 566.0-2413; European Patent Office; Sep. 29, 2009; 5 pages.

(Continued)

*Primary Examiner* — Nick Corsaro
*Assistant Examiner* — Mahendra Patel
(74) *Attorney, Agent, or Firm* — The Danamraj Law Group, P.C.

(57) ABSTRACT

A mobile communication device operable to automatically send a notification of a status change within a messaging session. The device includes a processor operable to execute a real-time messaging application on the mobile communication device, an input module operable to receive a session status change instruction from a user and a status update module operable to generate a session status change message responsive to receipt of the session status change instruction from the user. The device further includes a transceiver operable to communicate with a plurality of remote devices and operable to automatically transmit the session status change message to each one of a group of at least two remote real-time messaging applications responsive to the generation of the session status change message by the status update module.

20 Claims, 8 Drawing Sheets

U.S. PATENT DOCUMENTS

| | | | |
|---|---|---|---|
| 2006/0035632 A1* | 2/2006 | Sorvari et al. | 455/418 |
| 2006/0053379 A1* | 3/2006 | Henderson et al. | 715/751 |
| 2006/0083221 A1* | 4/2006 | Yanai et al. | 370/352 |
| 2006/0117264 A1* | 6/2006 | Beaton et al. | 715/751 |
| 2007/0072631 A1* | 3/2007 | Mock et al. | 455/466 |
| 2007/0072637 A1* | 3/2007 | Inoue | 455/518 |
| 2008/0086564 A1* | 4/2008 | Putman et al. | 709/227 |

FOREIGN PATENT DOCUMENTS

| | | |
|---|---|---|
| WO | 03100637 A1 | 12/2003 |
| WO | 2004095815 A1 | 11/2004 |
| WO | 2005104600 A1 | 11/2005 |
| WO | 2005115035 A1 | 12/2005 |

OTHER PUBLICATIONS

European Search Report; European Patent Office; Apr. 13, 2007; 7 pages.

"Notice Requesting Submission of Opinion" (Translation) for Application No. 10-2007-0105610; Korean Intellectual Property Office; Jun. 10, 2009; 56 pages.

Japanese Office Action; Application No. 2007-271827; Japanese Patent Office; Feb. 17, 2010; 3 pages.

Mexican Office Action; Application No. MX/a/2007/013034; Mexican Institute of Industrial Property; Mar. 5, 2010; 3 pages.

AU Examiner's Report, Application No. 2007229406, IP Australia, Nov. 16, 2010, 2 pgs.

Canadian Office Action, Application No. 2606919, dated Aug. 20, 2010, 2 pgs.

Mexican Office Action, Application No. MX/a/2007/013034, dated Aug. 6, 2010, 4 pgs.

Chinese Office Action, Application No. 2010082700433190, dated Sep. 1, 2010, 6 pgs.

European Communication Examination Report, Application No. 06 122 566.0, dated Oct. 21, 2010, 5 pgs.

CN Office Action, Application No. 200710300797.7, Chinese IPO, Apr. 28, 2011, 2 pgs.

MX Office Action, Application No. MX/a/2007/013034, Mexican IPO, Feb. 24, 2011, 2 pgs.

* cited by examiner

METHOD, SYSTEM AND APPARATUS FOR AUTOMATIC NOTIFICATION TO A PLURALITY OF COMMUNICATION NODES

TECHNICAL FIELD OF THE APPLICATION

The present disclosure generally relates to wireless packet data service networks. More particularly, and not by way of any limitation, the present disclosure is directed to a mobile communications device and related data service network employing a method, apparatus and system for automatically executing a status change within a communication session with multiple remote devices.

BACKGROUND

The present disclosure is directed toward the execution of a status change within a plurality of communication sessions between a mobile communication device and two or more remote devices. It is known in the art to provide communication sessions between multiple communication devices according to a variety of communication systems. These include, for example, short message systems (SMS) commonly employed in connection with cellular networks and instant messaging (IM) systems more commonly employed on desktop and laptop computers. A user of any of these systems generally maintains an address or contacts book which includes the names and contact information for acquaintances of the user in order to facilitate communication with those acquaintances.

BRIEF DESCRIPTION OF THE DRAWINGS

A more complete understanding of the embodiments of the present disclosure may be had by reference to the following Detailed Description when taken in conjunction with the accompanying drawings wherein.

DETAILED DESCRIPTION OF THE DRAWINGS

A system and method of the present disclosure will now be described with reference to various examples of how the embodiments can best be made and used. Identical reference numerals are used throughout the description and several views of the drawings to indicate identical or corresponding parts, wherein the various elements are not necessarily drawn to scale.

The present disclosure relates to a mobile communication device. The device comprises a processor operable to execute a real-time messaging application on the mobile communication device, an input module operable to receive a session status change instruction from a user, a status update module operable to generate a session status change message responsive to receipt of the session status change instruction from the user and a transceiver operable to communicate with a plurality of remote devices and operable to automatically transmit the session status change message to each one of a group of at least two remote real-time messaging applications responsive to the generation of the session status change message by the status update module.

In certain embodiments, the transceiver is a wireless transceiver. The real-time messaging application may be selected from: an instant messaging (IM) application, a short message system (SMS) application and a chat application. The status change message may be customizable by the user. The session status change instruction may be an instruction to open a new communication session. The session status change instruction may be an instruction to close an existing communication session. The remote real-time messaging applications receiving the status change message may be associated with entries in the user's contacts database.

According to a second aspect, the present disclosure relates to a method of automatically sending a status change notification within a plurality of real-time messaging sessions. The method comprises the steps of receiving from a user of a mobile communication device a session status change instruction, generating a session status change message responsive to the session status change instruction, identifying a plurality of remote devices engaged in a real-time messaging session with the mobile communication device and automatically sending the session status change message to each of the remote devices.

According to a third aspect, the present disclosure relates to a mobile communication system. The system comprises a mobile communication device having a local real-time messaging application executing thereon, means for establishing a real-time messaging session between the local real-time messaging application and each one of a plurality of remote real-time messaging applications executing on a plurality of remote devices, means for receiving a session status change instruction from a user, means for generating a session status change message responsive to receipt of the session status change instruction and means for automatically sending the session status change message to each remote real-time messaging application responsive to receipt of the session status change instruction.

Figure 1:
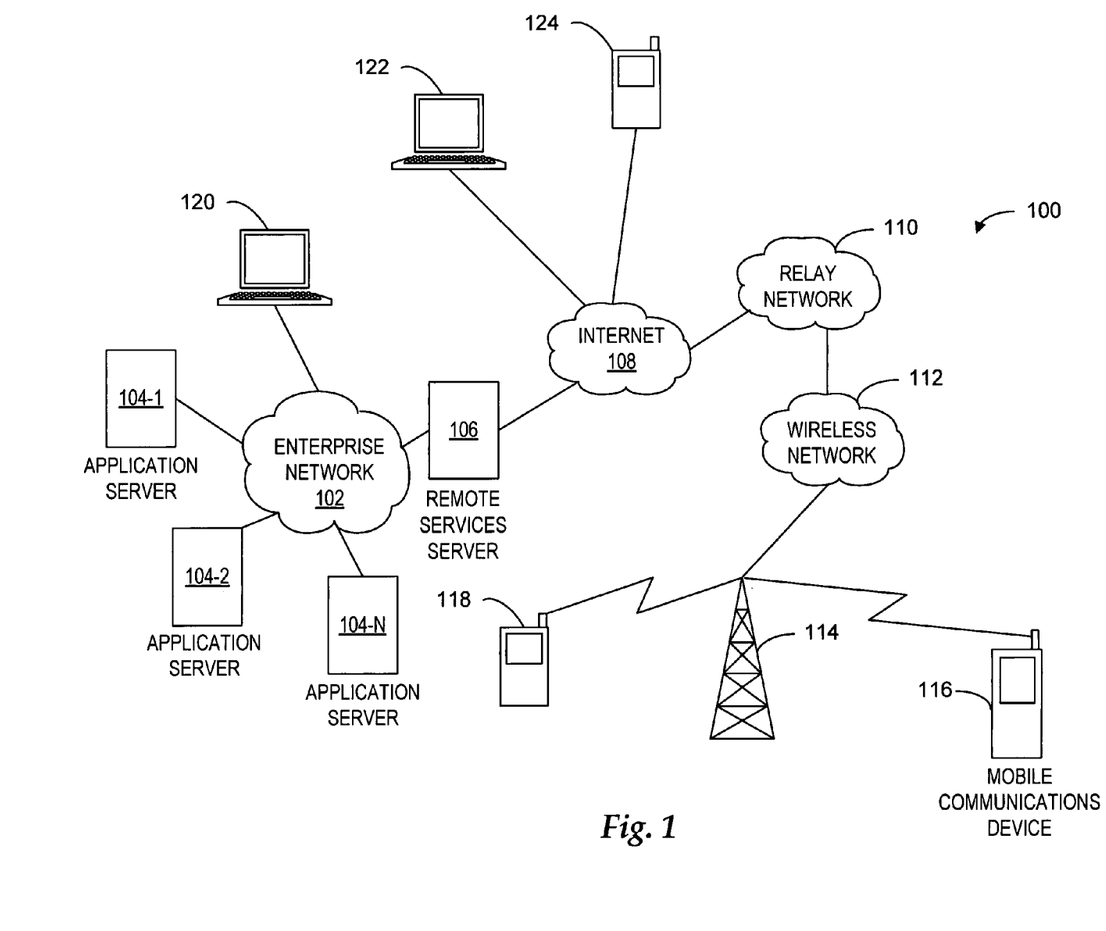
FIG. 1 depicts an exemplary network environment including a wireless packet data service network wherein an embodiment of the present disclosure may be practiced.

Referring now to the drawings, and more particularly to FIG. 1, depicted therein is an exemplary network environment 100 including a wireless packet data service network 112 wherein an embodiment of the present system may be practiced. An enterprise network 102, which may be a packet-switched network, can include one or more geographic sites and be organized as a local area network (LAN), wide area network (WAN) or metropolitan area network (MAN), et cetera, for serving a plurality of corporate users.

A number of application servers 104-1 through 104-N disposed as part of the enterprise network 102 are operable to provide or effectuate a host of internal and external services such as email, video mail, Internet access, corporate data access, messaging, calendaring and scheduling, information management, and the like. A single desktop computer 120 is shown connected to enterprise network 102, but those of skill in the art will appreciate that a diverse array of devices, including but not limited to desktop computers, laptop computers, palmtop computers, et cetera, although not specifically shown in FIG. 1, may be operably networked to one or more of the application servers 104-$i$, i=1, 2, . . . ,N, with respect to the services supported within enterprise network 102.

Additionally, a remote services server 106 may be interfaced with the enterprise network 102 for enabling a corporate user to access or effectuate any of the services from a remote location using a suitable mobile communications devices 116, 118. By way of example, either or both of mobile communications devices 116, 118 may be a data-enabled handheld device capable of receiving and sending messages, web browsing, interfacing with corporate application servers, et cetera. A secure communication link with end-to-end encryption may be established that is mediated through an external IP network, i.e., a public packet-switched network such as the Internet 108, as well as the wireless packet data service network 112 operable with mobile communications devices 116, 118 via suitable wireless network infrastructure that includes a base station (BS) 114.

A single desktop computer 122 and mobile communication device 124 are shown connected to internet 108 for purposes of illustration. Those of skill in the art will appreciate that millions of devices are in fact connected to the internet 108, as discussed above with respect to enterprise network 102. These include, but are not limited to, desktop computers, laptop computers, palmtop computers, cellular telephones, personal digital assistants and other mobile communications devices. In one embodiment, a trusted relay network 110 may be disposed between the Internet 108 and the infrastructure of wireless packet data service network 112.

For purposes of the present disclosure, the wireless packet data service network 112 may be implemented in any known or heretofore unknown mobile communications technologies and network protocols. For instance, the wireless packet data service network 112 may be comprised of a General Packet Radio Service (GPRS) network that provides a packet radio access for mobile devices using the cellular infrastructure of a Global System for Mobile Communications (GSM)-based carrier network. In other implementations, the wireless packet data service network 112 may comprise an Enhanced Data Rates for GSM Evolution (EDGE) network, an Integrated Digital Enhanced Network (IDEN), a Code Division Multiple Access (CDMA) network, or any 3rd Generation (3G) network. By way of providing an exemplary embodiment, the teachings of the present disclosure will be illustrated with a GPRS-based carrier network, although those skilled in the art should readily recognize that the scope of the present disclosure is not limited thereby.

Figure 2:
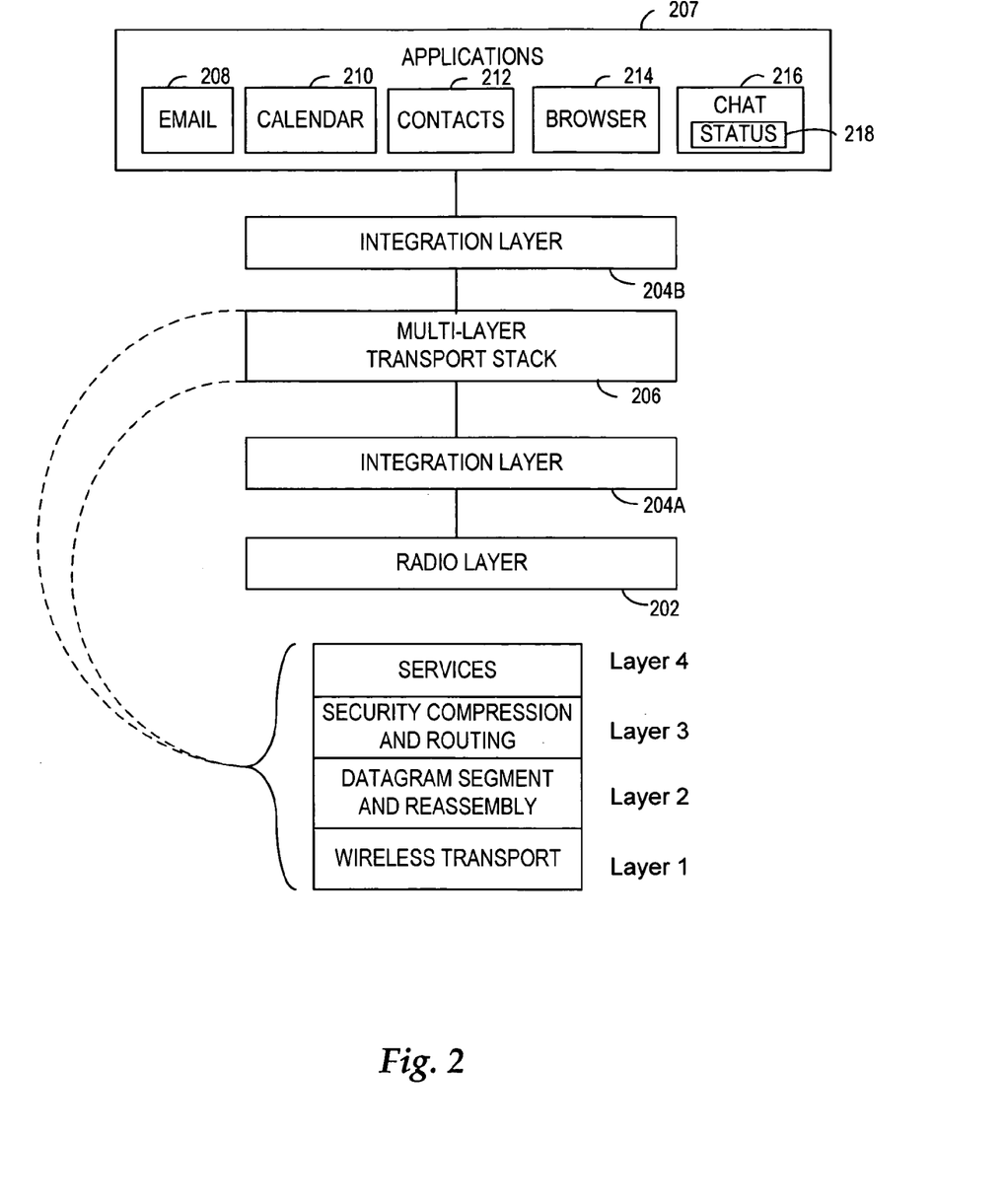
FIG. 2 depicts a software architectural view of a mobile communications device operable to automatically initiate and terminate a data session between a user preferred application and related remote applications according to one embodiment.

FIG. 2 depicts a software architectural view of a mobile communications device according to one embodiment. A multi-layer transport stack (TS) 206 is operable to provide a generic data transport protocol for any type of corporate data, including email, via a reliable, secure and seamless continuous connection to a wireless packet data service network. As illustrated in this embodiment, an integration layer 204A is operable as an interface between the radio layer 202 and the transport stack 206 of mobile communications device 116. Likewise, another integration layer 204B is provided for interfacing between the transport stack 206 and the user applications 207 supported on the mobile communications device 116, e.g., email 208, calendar/scheduler 210, contact management 212, browser 214 and chat application 216. As seen in FIG. 2, chat application 216 incorporates a status update module 218, which is operable to monitor the status of the chat application 216 and communicate recent and upcoming status changes to devices in communication with the chat application 216, as discussed in further detail below. Although not specifically shown, the transport stack 206 may also be interfaced with the operating system of mobile communications device 116. In another implementation, the transport stack 206 may be provided as part of a data communications client module operable as a host-independent virtual machine on a mobile device.

The bottom layer (Layer 1) of the transport stack 206 is operable as an interface to the wireless network's packet layer. Layer 1 handles basic service coordination within the exemplary network environment 100 shown in FIG. 1. For example, when a mobile communications device roams from one carrier network to another, Layer 1 verifies that the packets are relayed to the appropriate wireless network and that any packets that are pending from the previous network are rerouted to the current network. The top layer (Layer 4) exposes various application interfaces to the services supported on the mobile communications device. The remaining two layers of the transport stack 206, Layer 2 and Layer 3, are responsible for datagram segmentation/reassembly and security, compression and routing, respectively.

Figure 3:
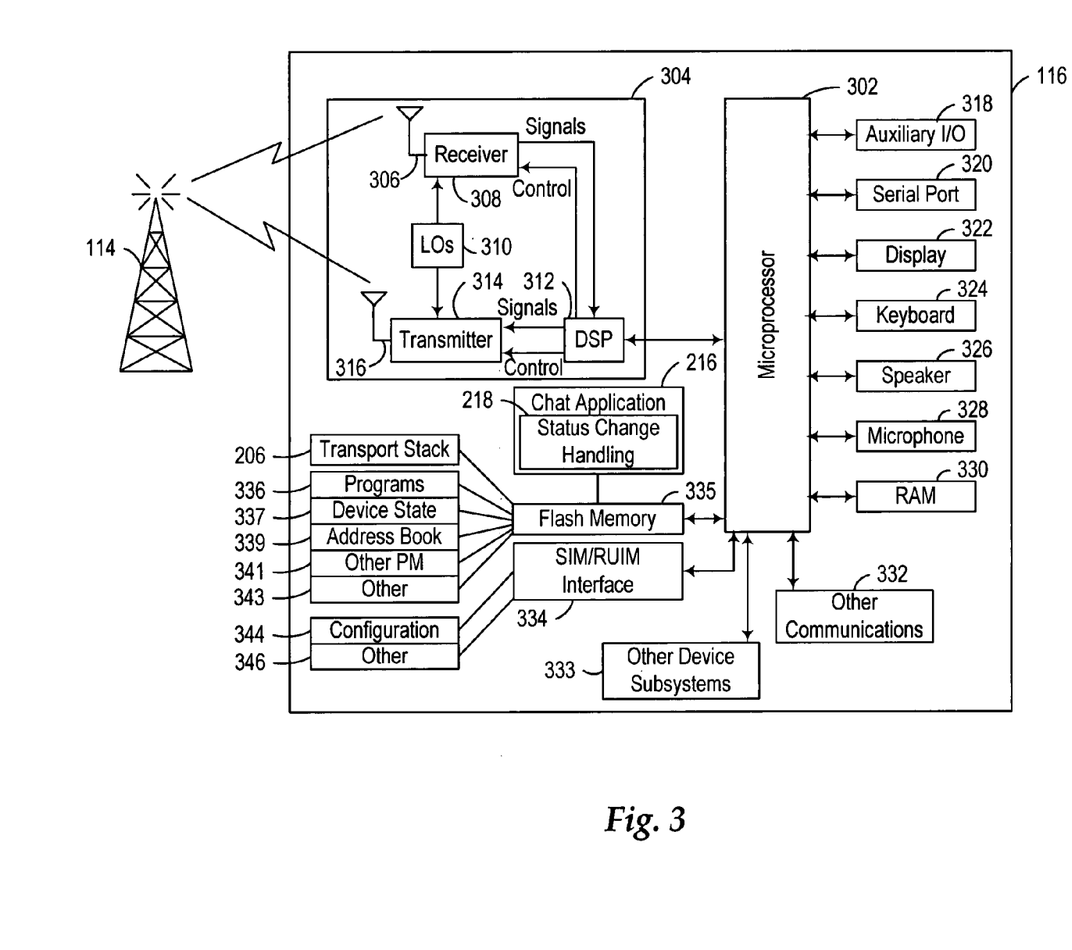
FIG. 3 depicts a block diagram of a mobile communications device operable to automatically initiate and terminate a data session between a user preferred application and related remote applications according to one embodiment.

FIG. 3 depicts a block diagram of a mobile communications device according to one embodiment. It will be recognized by those skilled in the art upon reference hereto that although an embodiment of mobile communications device 116 may comprise an arrangement similar to one shown in FIG. 3, there can be a number of variations and modifications, in hardware, software or firmware, with respect to the various modules depicted. Accordingly, the arrangement of FIG. 3 should be taken as illustrative rather than limiting with respect to the embodiments of the present disclosure.

A microprocessor 302 providing for the overall control of an embodiment of mobile communications device 116 is operably coupled to a communication subsystem 304 which includes a receiver 308 and transmitter 314 as well as associated components such as one or more local oscillator (LO) modules 310 and a processing module such as a digital signal processor 312. As will be apparent to those skilled in the field of communications, the particular design of the communication module 304 may be dependent upon the communications network with which the mobile communications device 116 is intended to operate.

In one embodiment, the communication module 304 is operable with both voice and data communications. Regardless of the particular design, however, signals received by antenna 306 through base station 114 are provided to receiver 308, which may perform such common receiver functions as signal amplification, frequency down conversion, filtering, channel selection, analog-to-digital (A/D) conversion, and the like. Similarly, signals to be transmitted are processed, including modulation and encoding, for example, by digital signal processor 312, and provided to transmitter 314 for digital-to-analog (D/A) conversion, frequency up conversion, filtering, amplification and transmission over the air-radio interface via antenna 316.

Microprocessor 302 also interfaces with further device subsystems such as auxiliary input/output (I/O) 318, serial port 320, display 322, keyboard 324, speaker 326, microphone 328, random access memory (RAM) 330, a short-range communications subsystem 332, and any other device subsystems generally labeled as reference numeral 333. To control access, a Subscriber Identity Module (SIM) or Removable User Identity Module (RUIM) interface 334 is also provided in communication with the microprocessor 302.

In one implementation, SIM/RUIM interface 334 is operable with a SIM/RUIM card having a number of key configurations 344 and other information 346 such as identification and subscriber-related data. Operating system software and transport stack software may be embodied in a persistent storage module (i.e., non-volatile storage) such as Flash memory 335. In one implementation, flash memory 335 may be segregated into different areas, e.g., storage area for computer programs 336 as well as data storage regions such as device state 337, address book 339, other personal information manager (PIM) data 341, and other data storage areas generally labeled as reference numeral 343. Chat application 216, including status update module 218, is operably connected to flash memory 335, including transport stack 206. As noted above and described in further detail below, status update module 218 is operable to communicate stats updates to other devices as appropriate, generally via a wireless communication path.

Figure 4:
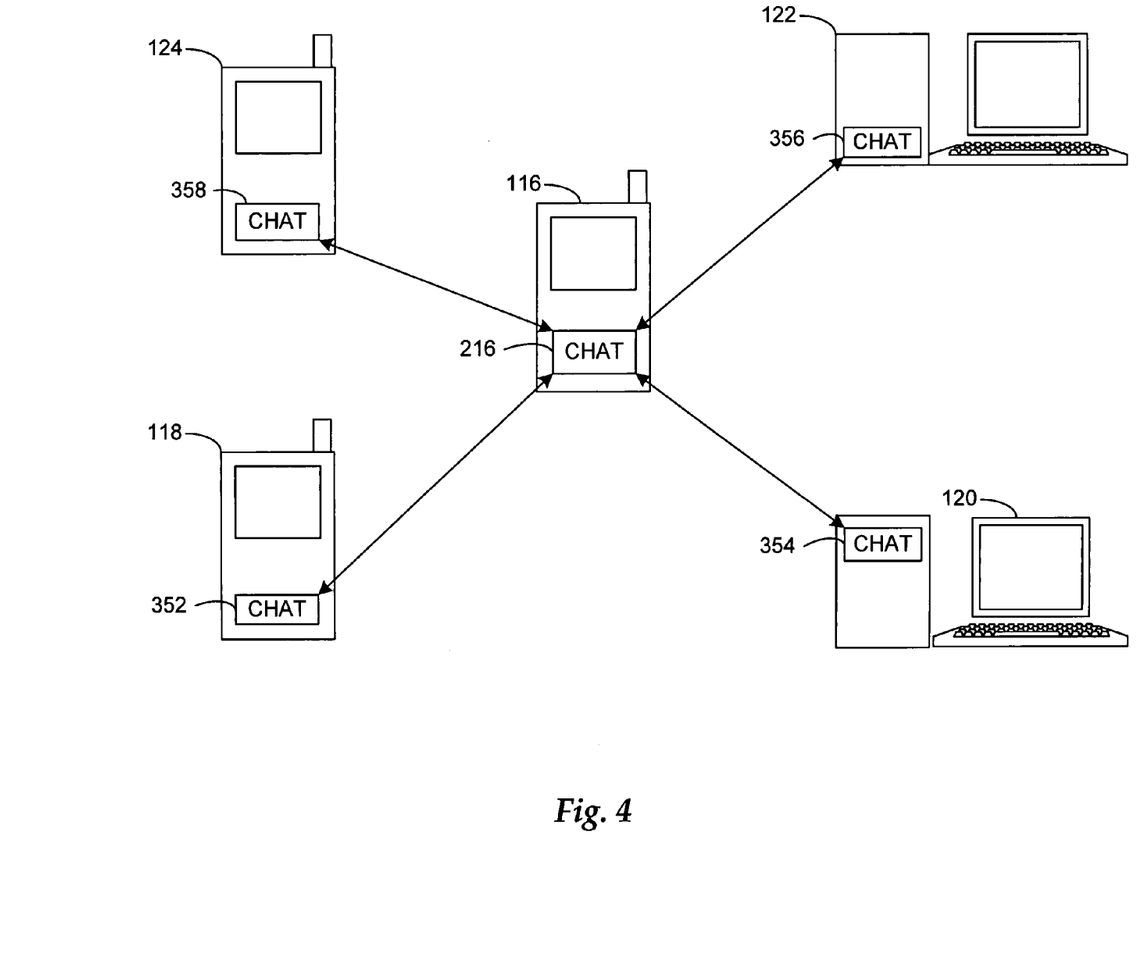
FIG. 4 depicts a mobile communication device in operable communication with a set of remote devices.

FIG. 4 depicts a schematic view of chat application 216 running on mobile communication device 116 in communication with a group of chat applications 352, 354, 356, 358 operating on a group of remote devices 118, 120, 122, 124. In certain cases, the chat applications 352, 354, 356, 358 may be essentially the same application running on separate devices. In other situations, the chat applications 352, 354, 356, 358 may be different applications operating according to a common communications protocol. In any event, the chat applications 352, 354, 356, 358 will generally incorporate a "chat room" or similar common communication forum shared by the users of devices 118, 120, 122, 124. Although the present disclosure uses the term "chat," those of skill in the art will appreciate that the present disclosure applies to a wide variety of messaging application types, including but not limited to instant messaging (IM) systems and short message systems (SMS). Certain aspects of the present disclosure also apply to asynchronous electronic message systems, including electronic mail. Accordingly, "chat" applications 216, 352, 354, 356, 358 may in certain situations represent instant messaging, SMS or email applications.

In general, users who are "logged in" to a chat forum during a certain time period will receive all public messages posted to the forum during that time period. A user may or may not receive public messages posted to the chat forum while the user is not logged in. Certain chat forums include the ability to transmit private messages, which are viewable only by the specific users to whom the private messages are addressed. Certain chat forums make use of a central server running a chat host application which distributes the messages to client applications. The use of a central server or chat server application is not, however, necessary to the operation of a chat forum. A chat forum can be maintained between client applications in peer-to-peer relationships.

When a user logs into a chat or instant messaging environment, it is a common practice to send a greeting to other known users, in order to inform the other users that the user is logged in. Similarly, it is common practice to send a closing salutation to known users, in order to inform the other users that the user is about to be unavailable, because the user is logging off or will be away from his or her computer. Where the user is communicating only with a single individual or within a single public forum, it is a simple matter to transmit a "hello," "away," "busy" or "goodbye" message to the group or the single individual. Where, however, the user is communicating within multiple public forums or with a plurality of individuals, generating and transmitting a plurality of greetings, status notices or closing salutations is inconvenient and time-consuming.

In order to facilitate efficient and convenient communication between users of instant messaging applications, chat application 216 operating on mobile communication device 116 incorporates status update module 218. The operation of status update module 218 may vary depending on user preferences. In certain situations, status update module 218 may be programmed to send a greeting to the users known to the user of mobile communication device 116 whenever chat application 216 first logs into the messaging forum. In certain cases, a personalized greeting may be sent to each known user upon login. In certain cases, personalized messages may be sent to known users upon the occurrence of any change in status, including but not limited to a login event, a logout event, a lost connection, an occupied or busy user, a user currently away from the device, entry into one of a plurality of geographic areas, the passage of time or power down of the mobile communication device 116.

In certain embodiments, notification of a status change could be initiated through the use of a short cut key or menu selection by the user. The notification may be preconfigured to send a particular message, or the user may choose from a list of pre-formatted notification messages. In certain embodiments, the status change message may be communicated only to those communication nodes with whom the user of the mobile communication device 116 has had recent communications. The "time out" may be preconfigured and may be customizable.

Figure 5:
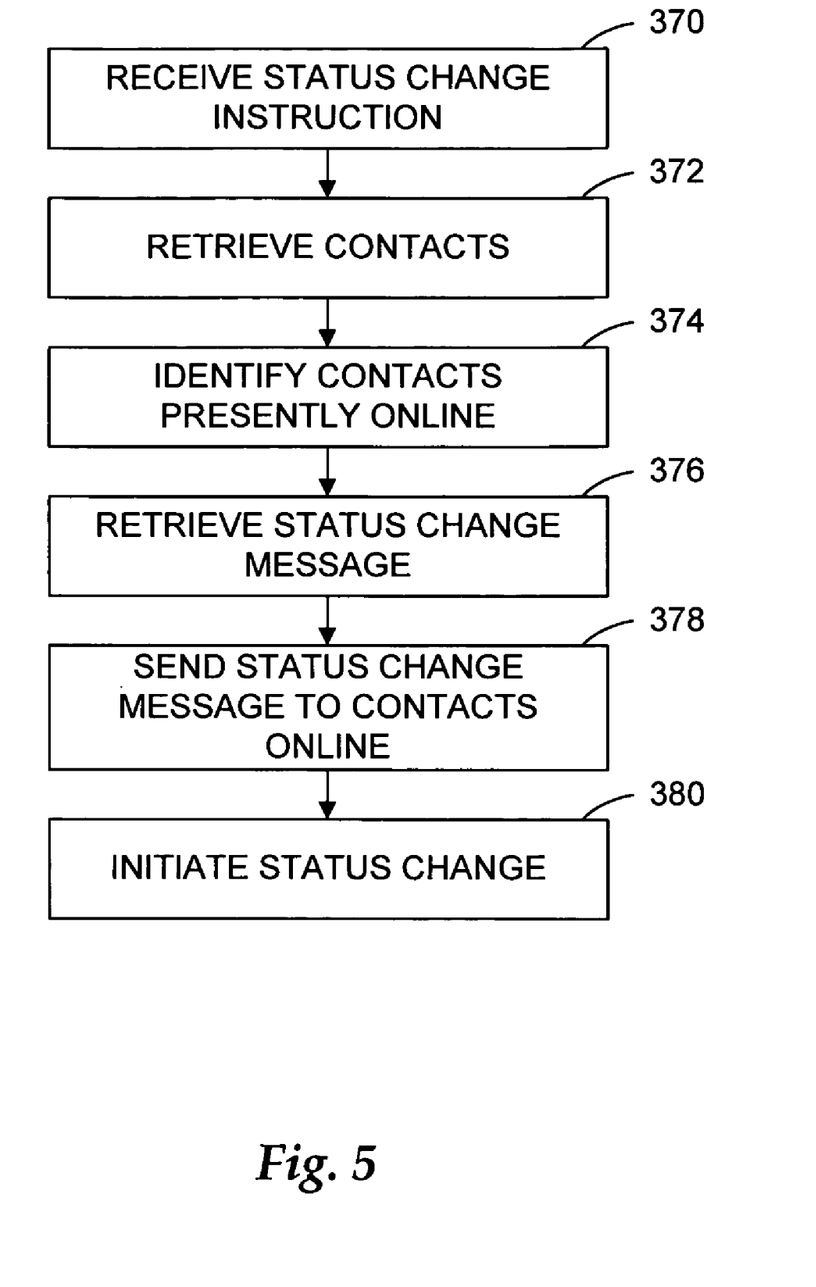
FIG. 5 is a flowchart depicting the process of managing messaging status updates concurrently with a change in messaging status.

FIG. 5 depicts the operation of status update module 218 in general terms. In block 370, status update module 218 ascertains a status change. In certain cases, a status change may result from an instruction, such as a login or logout instruction, from the user or some other source. In certain cases, status update module 218 may ascertain a status change due to the existence of certain conditions. For example, if the user is receiving a telephone call via mobile communication device 116, or checking an incoming email message, status update module 218 may be programmed to automatically generate a message to friends such as "Be right back." In any event, a status change is ascertained in some manner and process flow proceeds to block 372.

In block 372, status update module 218 retrieves certain contacts data from the user's personal contacts database. The contacts data retrieved will generally include, but is not necessarily limited to, the user ids or nicknames employed by the contacts within the present messaging forum. Once the contacts data is retrieved, process flow proceeds to block 374, where status update module 218 identifies those contacts, if any, who are presently logged in to the messaging forum, and process flow proceeds to block 376.

In block 376, status update module 218 retrieves the appropriate status change message for each of the identified contacts. In certain cases, the identical message may be transmitted to a plurality of contacts. In certain cases, there may be a default message for each type of status change, which may be overridden according to user preference in favor of a selected stock message or a custom message. In certain cases, the message to be transmitted to other users may be selected by the user at the time of the status change. In certain cases, one of a set of selected messages may be sent according to a random selection algorithm. Once a status change message is retrieved, it is sent to each of the identified online contacts in block 378, and then the status change is initiated in block 380.

Figure 6:
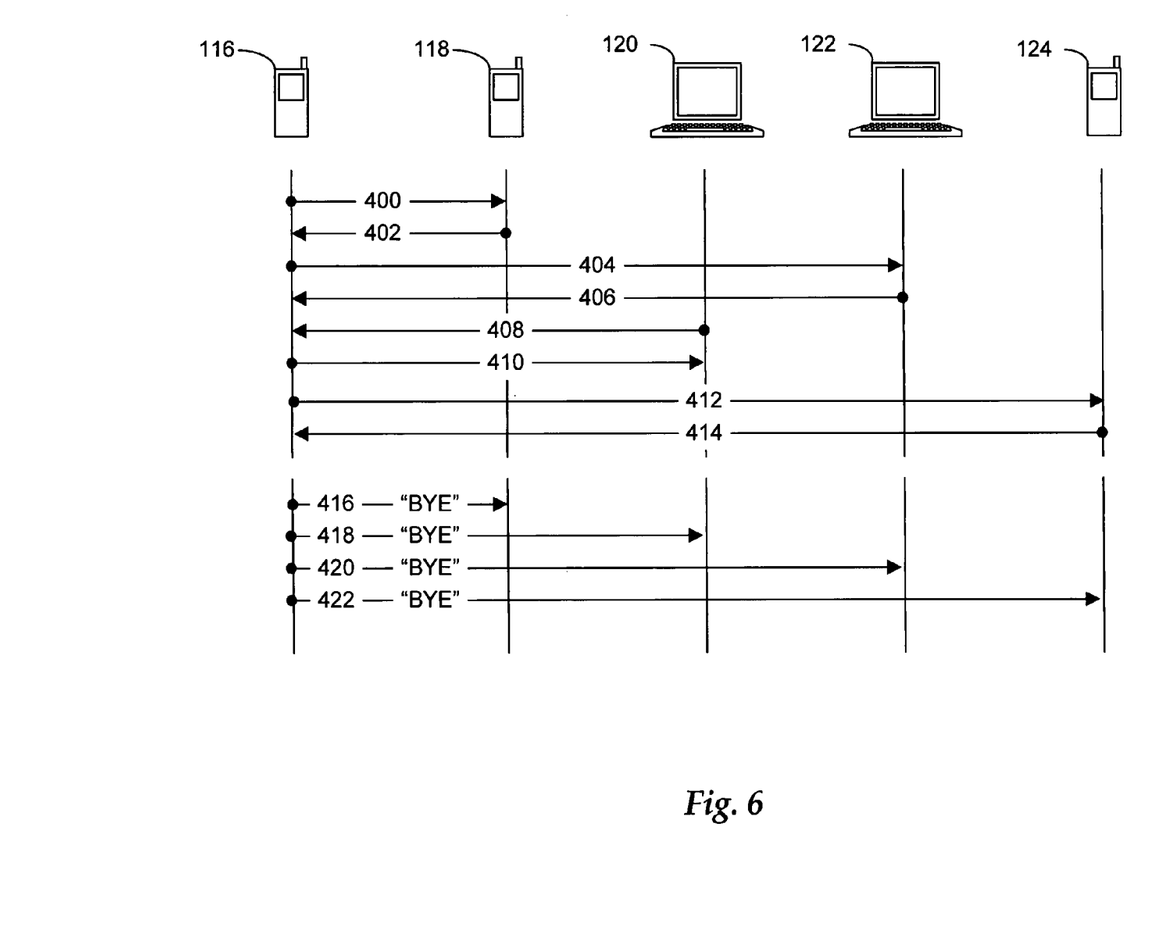
FIG. 6 depicts a message flow diagram showing the flow of messages between a mobile communication device and remote devices after a change in messaging status.

The process elaborated in FIG. 5 is depicted as a message flow diagram in FIG. 6. Initially, mobile communication device 116 is in communication with remote devices 118, 120, 122 and 124. Messages 402, 404 represent communications between mobile communication device 116 and remote device 118. Messages 404, 406 represent a subsequent round of communication between mobile communication device 116 and remote device 122. Thereafter, a series of messages represented by messages 408, 410 is exchanged between mobile communication device 116 and remote device 120. Finally, communications are exchanged between mobile communication device 116 and remote device 124, as represented by messages 412, 414.

Subsequent to the messages exchanges described above, a change in communications status is initiated, in this case the end of the current communications session. Prior to termination of the current communications session between mobile communication device 116 and remote devices 118, 120, 122, 124, mobile communication device 116 initiates a set of closing salutation messages 416, 418, 420, 422 from mobile communication device 116 to each of remote devices 118, 120, 122, 124. Although messages 416, 418, 420, 422 are shown containing the same information, alternate embodiments may send different message content to different users. Further, although messages 416, 418, 420, 422 are shown being sent in sequence, alternate embodiments may send messages simultaneously. After delivery of the closing salutation messages 416, 418, 420, 422, mobile communication device 116 terminates the current communication session with remote devices 118, 120, 122, 124. This process is shown in flowchart form in FIG. 8, which is described in detail below.

Figure 7:
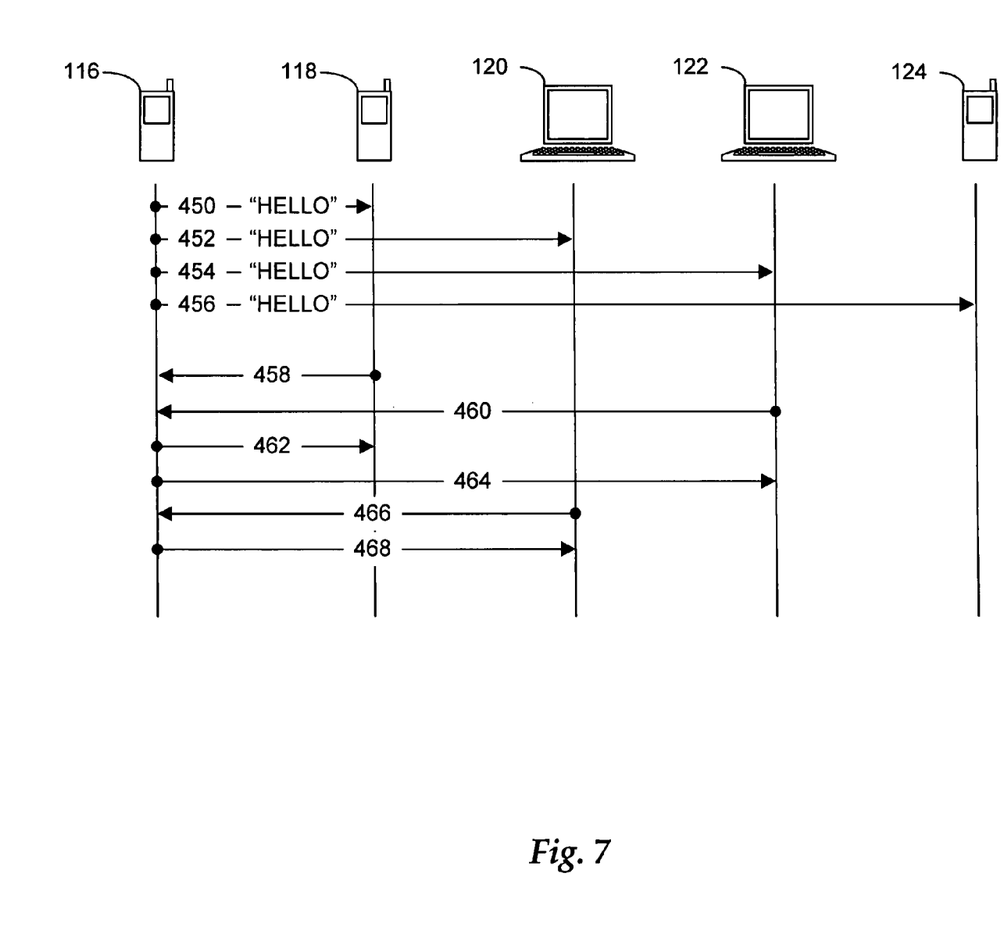
FIG. 7 depicts a message flow diagram showing the flow of messages between a mobile communication device and remote devices immediately prior to a change in messaging status.

As noted above, the present disclosure is not limited in its scope to any particular type of change in messaging status. In much the same manner as the present disclosure is employed in connection with the termination of a messaging session, the teachings of the present disclosure may be employed in connection with, for example, an initiation of a messaging session. For purposes of illustration, FIG. 7 depicts the latter circumstance, wherein a greeting is sent to friends and other contacts upon the initiation of a messaging session.

Initially, mobile communication device 116 initiates or joins a messaging session with remote devices 118, 120, 122, 124. In order to inform the users of remote devices 118, 120, 122, 124 that the user of mobile communication device 116 is online and available for messaging, mobile communication device 116 sends a set of initial greetings 450, 452, 454, 456 from mobile communication device 116 to remote devices 118, 120, 122, 124. Although greetings 450, 452, 454, 456 are shown containing the same information, alternate embodiments may send different message content to different users. Further, although greetings 450, 452, 454, 456 are shown being sent in sequence, alternate embodiments may send messages simultaneously. After receipt of the initial greetings from mobile communication device 116, the users of remote devices 118, 120, 122, 124 may respond with their own initial messages 458, 460, 466. The user of mobile communication device 116 may also send subsequent messages 462, 464, 468 as appropriate.

Figure 8:
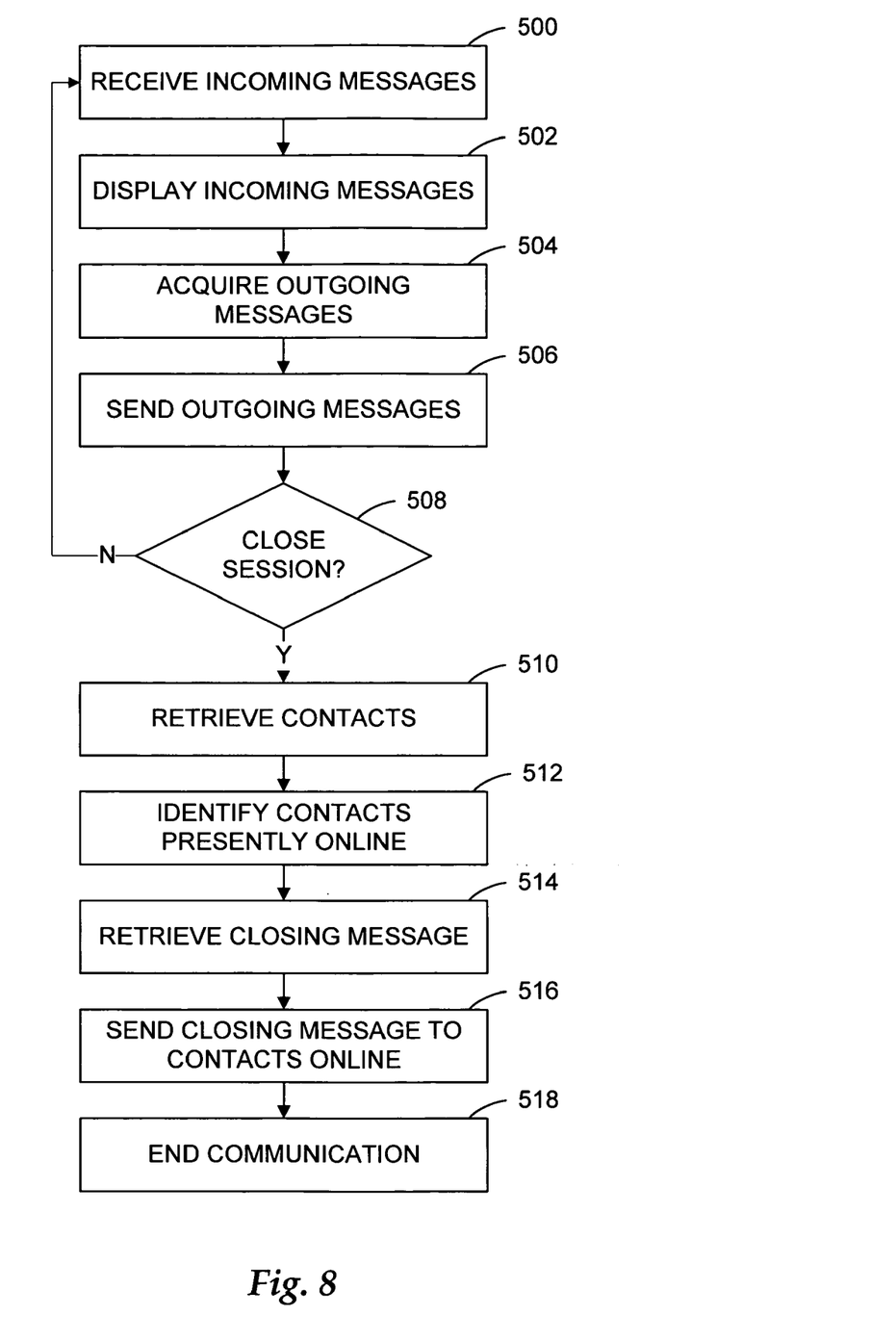
FIG. 8 is a flowchart depicting the process of managing messaging status updates prior to a change in messaging status.

FIG. 8 is a flowchart depicting the communication session closing process shown in FIG. 6. Process flow begins in block 500, wherein incoming messages are received, and proceeds to block 502, wherein the incoming messages are displayed to the user. Outgoing messages are acquired from the user in block 504 and sent in block 506. Decision block 508 determines whether the communication session is to be closed. If the session is to continue, process flow returns to block 500. If a session closing event has occurred, process flow proceeds to block 510, where the user's contacts are retrieved, and then to block 512, where the contacts presently online are identified. In block 514, a closing message is retrieved. In block 516, the closing message is sent to the contacts online. Process flow then proceeds to block 518, where the communication session is ended.

It is believed that the operation and construction of the embodiments of the present disclosure will be apparent from the Detailed Description set forth above. While the exemplary embodiments shown and described may have been characterized as being preferred, it should be readily understood that various changes and modifications could be made therein without departing from the scope of the present disclosure as set forth in the following claims.

What is claimed is:

1. A mobile communication device comprising:
 a processor configured to execute a real-time messaging application on the mobile communication device and to identify one or more remote real-time messaging applications operating on a group of remote devices with whom a user of the mobile communication device has had recent real-time messaging communications within a time out period;
 a module comprising a multi-layer transport stack interfaced with the processor for providing a data transport protocol;
 a status update module configured to receive a status update and generate a status change message for each of the identified remote real-time messaging applications, wherein the status update reflects recent and upcoming status changes of the real-time messaging application, wherein the upcoming status changes are associated with incoming events; and a transceiver configured to communicate with a plurality of remote devices and operable to automatically transmit the status change messages to each of the identified remote real-time messaging applications with whom the user of the mobile communication device has had recent real-time messaging communications within the time out period;
 wherein each one of the remote real-time messaging applications with whom a user of the mobile communication device has had recent real-time messaging communications within the time out period is associated with an entry in the user's contacts database.

2. The mobile communication device as recited in claim 1 wherein the transceiver is a wireless transceiver.

3. The mobile communication device as recited in claim 1 wherein the real-time messaging application is selected from: an instant messaging (IM) application, a short message system (SMS) application and a chat application.

4. The mobile communication device as recited in claim 1 wherein the status change is received from the user via one of a menu and a shortcut key.

5. The mobile communication device as recited in claim 1 wherein the status change is an instruction to open a new communication session.

6. The mobile communication device as recited in claim 1 wherein the status change is an instruction to close an existing communication session.

7. The mobile communication device as recited in claim 1 wherein the time out period is customizable.

8. A method of automatically sending a status change message within a plurality of real-time messaging sessions, the method comprising:
 receiving a status update reflecting recent and upcoming status changes of a real-time messaging application operating on a mobile communication device, wherein the upcoming status changes are associated with incoming events;

identifying one or more remote real-time messaging applications with whom a user of the mobile communication device has had recent real-time messaging communications within a time out period, wherein each of the remote real-time messaging applications is associated with an entry in the user's contacts database;

receiving a data transport protocol from a multi-layer transport stack interfaced with a processor of the mobile communication device;

responsive to the received status update and according to the data transport protocol, generating a status change message for each of the identified remote real-time messaging applications; and automatically sending the status change messages to each of the one or more remote real-time messaging applications with whom a user of the mobile communication device has had recent real-time messaging communications within time out period wherein each one of the remote real-time messaging applications receiving the status change message is associated with an entry in the user's contacts database.

9. The method as recited in claim 8 wherein the real-time messaging session is conducted via a wireless transceiver.

10. The method as recited in claim 8 wherein the real-time messaging session is selected from: an instant messaging (IM) session, a short message system (SMS) session and a chat session.

11. The method as recited in claim 8 wherein the status change message is customizable by the user of the mobile communication device.

12. The method as recited in claim 8 wherein the status change is an instruction to open a new communication session.

13. The method as recited in claim 8 wherein the status change is an instruction to close an existing communication session.

14. The method as recited in claim 8 wherein the time out period is customizable.

15. A mobile communication system comprising:

means for establishing a real-time messaging session between a local real-time messaging application executing on a mobile communication device and each one of a plurality of remote real-time messaging applications executing on a plurality of remote devices;

means for providing a data transport protocol interfaced with the means for establishing a real-time messaging session;

means for receiving a status update from the local real-time messaging application, wherein the status update reflects recent and upcoming status changes of the local real-time messaging application, wherein the upcoming status changes are associated with incoming events;

means for identifying, within the plurality of remote devices, one or more remote devices with whom a user of the mobile communication device has had recent real-time messaging communications within a time out period;

means for generating a status change message for each of the identified remote real-time messaging applications responsive to the received status update; and means for automatically forwarding the status change messages to each identified remote real-time messaging applications with whom the mobile communication device has had real-time messaging communications within the time out period, wherein each one of the remote real-time messaging applications receiving the status change message is associated with an entry in the user's contacts database.

16. The system as recited in claim 15 wherein the real-time messaging session is conducted via a wireless transceiver.

17. The system as recited in claim 15 wherein the real-time messaging session is selected from: an instant messaging (IM) session, a short message system (SMS) session and a chat session.

18. The system as recited in claim 15 wherein the status change message is customizable by the user of the mobile communication device.

19. The mobile communication device as recited in claim 1 wherein the status change message is customizable by the user of the mobile communication device.

20. The mobile communication device as recited in claim 1 wherein the status change is an indication of a condition change, wherein the condition change is the user of the mobile communication device receiving a telephone call or the user of the mobile communication device checking an incoming message.

* * * * *